(12) United States Patent
Shimizu

(10) Patent No.: US 11,543,827 B2
(45) Date of Patent: Jan. 3, 2023

(54) CONTROL METHOD, CONTROLLER, AND STORAGE MEDIUM

(71) Applicant: NEC CORPORATION, Tokyo (JP)

(72) Inventor: Masayoshi Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 382 days.

(21) Appl. No.: 16/811,366

(22) Filed: Mar. 6, 2020

(65) Prior Publication Data

US 2020/0310447 A1    Oct. 1, 2020

(30) Foreign Application Priority Data

Mar. 25, 2019    (JP) .............................. JP2019-056081

(51) Int. Cl.
| | |
|---|---|
| *G06F 7/00* | (2006.01) |
| *G05D 1/02* | (2020.01) |
| *B65G 1/137* | (2006.01) |
| *G06Q 10/08* | (2012.01) |
| *B65G 1/04* | (2006.01) |

(52) U.S. Cl.
CPC ......... *G05D 1/0217* (2013.01); *B65G 1/0492* (2013.01); *B65G 1/1373* (2013.01); *G06Q 10/087* (2013.01); *G05D 2201/0216* (2013.01)

(58) Field of Classification Search
CPC ......... G05D 1/0217; G05D 2201/0216; G05D 1/0044; G05D 1/027; G05D 1/0274; B65G 1/0492; B65G 1/1373; B65G 1/1375; G06Q 10/087

USPC ..................................... 701/23; 700/213–216
See application file for complete search history.

(56) References Cited

U.S. PATENT DOCUMENTS

| | | | |
|---|---|---|---|
| 9,623,558 B1* | 4/2017 | Stubbs ................. | G05D 1/0011 |
| 2016/0229631 A1* | 8/2016 | Kimura ................. | G06Q 10/08 |
| 2016/0253619 A1* | 9/2016 | Miles ................... | H04W 4/029 |
| | | | 701/517 |

FOREIGN PATENT DOCUMENTS

| | | |
|---|---|---|
| JP | 2000-1211 A | 1/2000 |
| JP | 2004-1949 A | 1/2004 |
| JP | 2005-301698 A | 10/2005 |
| JP | 2017-211406 A | 11/2017 |
| WO | 2015/097736 A1 | 7/2015 |
| WO | 2016/129045 A1 | 8/2016 |
| WO | 2016/132534 A1 | 8/2016 |

OTHER PUBLICATIONS

Office Action dated May 13, 2020 in Japanese Application No. 2019-056081.

* cited by examiner

*Primary Examiner* — Yolanda R Cumbess
(74) *Attorney, Agent, or Firm* — Sughrue Mion, PLLC

(57) ABSTRACT

A control method performed by a controller includes calculating times required for a worker to load, on an automated guided vehicle, multiple articles placed in multiple locations regarding multiple cases among which a stop situation of the automated guided vehicle where the worker loads the articles varies and determining a position in which the automated guided vehicle is to be stopped, based on the calculated times.

12 Claims, 9 Drawing Sheets

Fig. 3A
(A) STOP → ROTATION
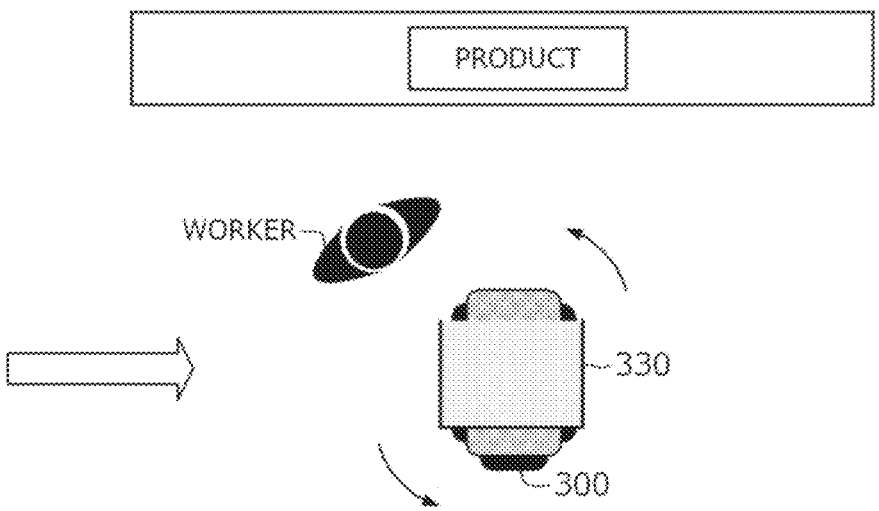
Fig. 3B
(B) STOP → TRANSLATION
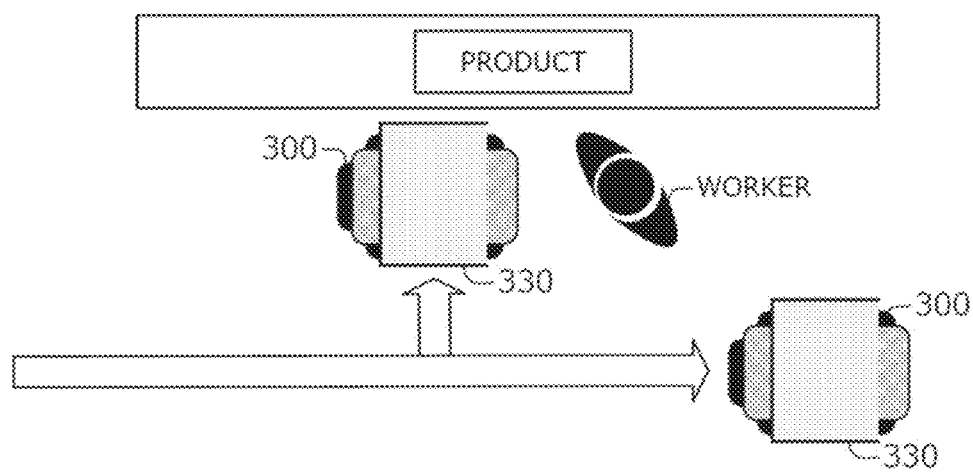
Fig. 4
| PRE-STOP OPERATION | AGV PREPARATION TIME |
|---|---|
| XXXX | TT |

Fig. 5

| ID | PRODUCT NAME | SIZE | WEIGHT |
|---|---|---|---|
| 1 | xxxxx | yy | zz |
| 2 | aaaaa | bb | cc |
| ⋮ | ⋮ | ⋮ | ⋮ |

| ID | SEX | AGE | TRANSPORTABLE WEIGHT |
|---|---|---|---|
| 1 | xx | aaa | ααα |
| 2 | yy | bbb | βββ |
| ⋮ | ⋮ | ⋮ | ⋮ |

243

(A) TWO STOP POSITIONS

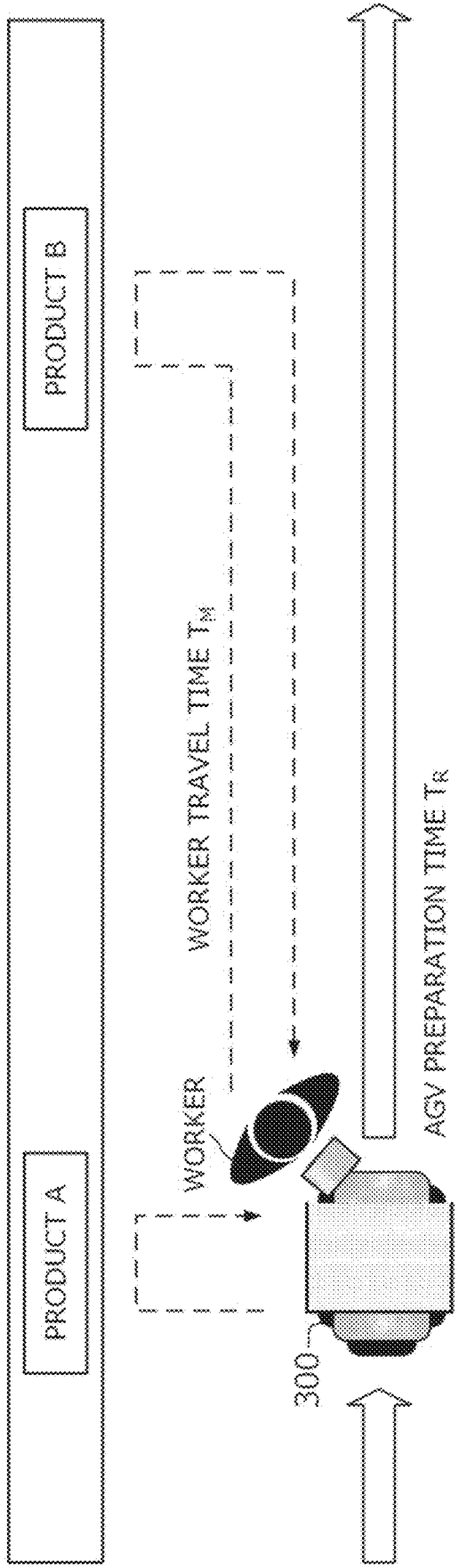

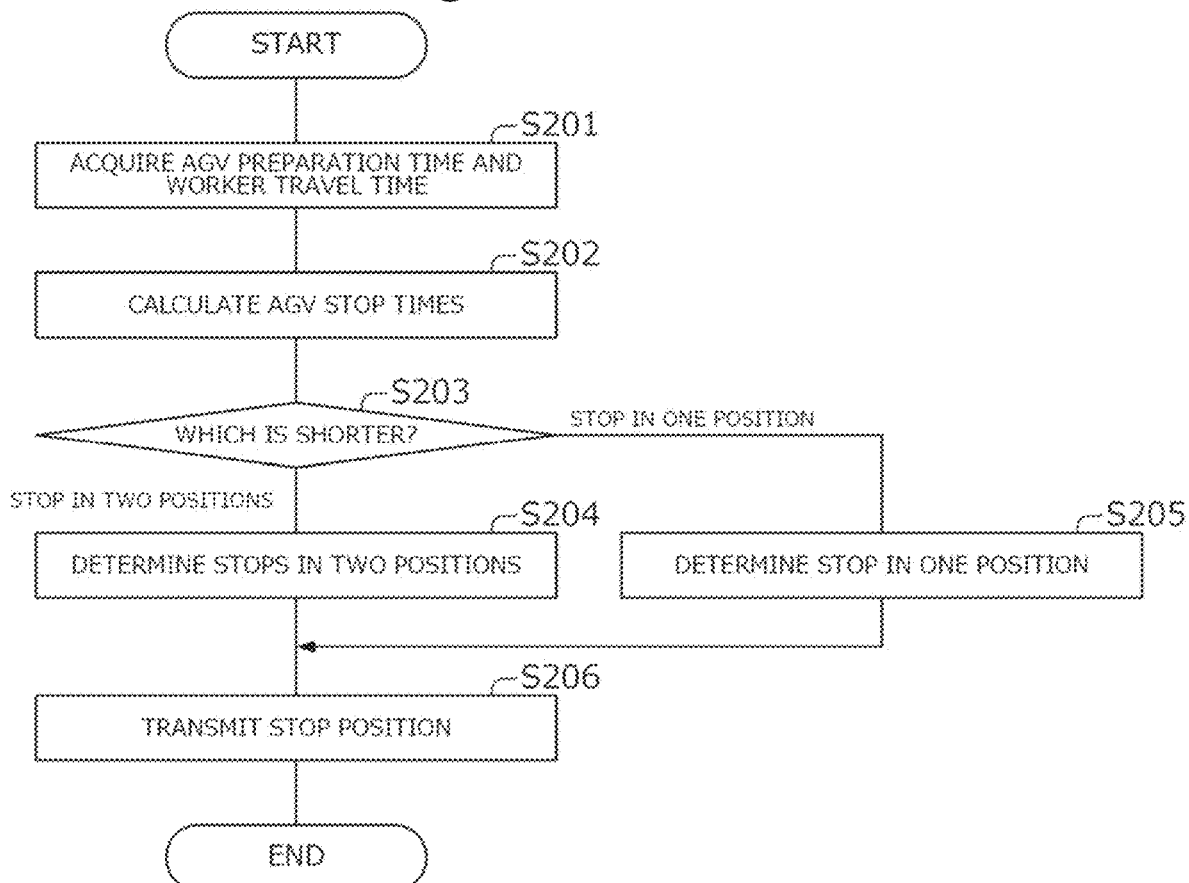

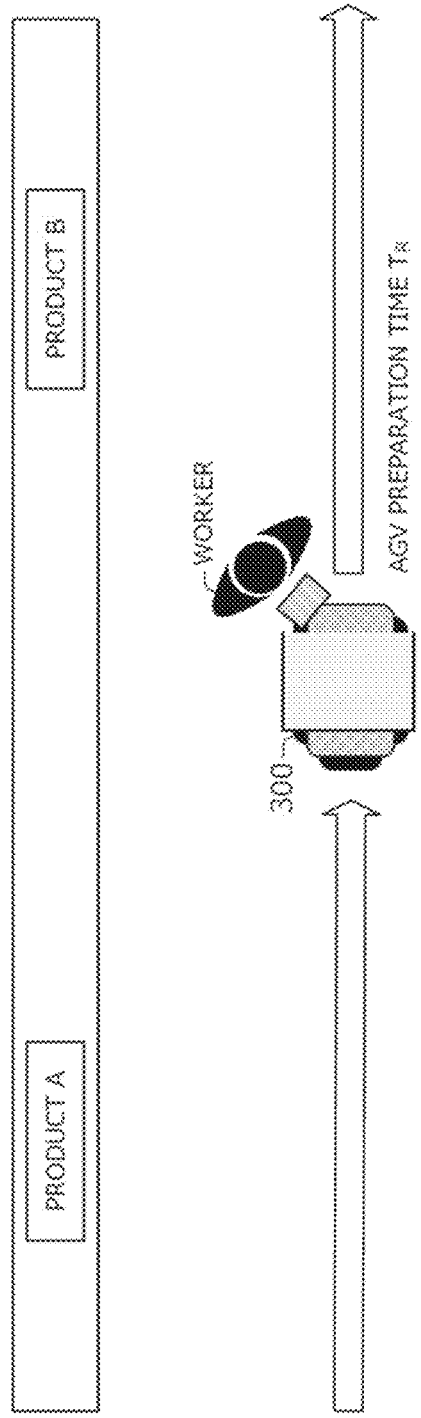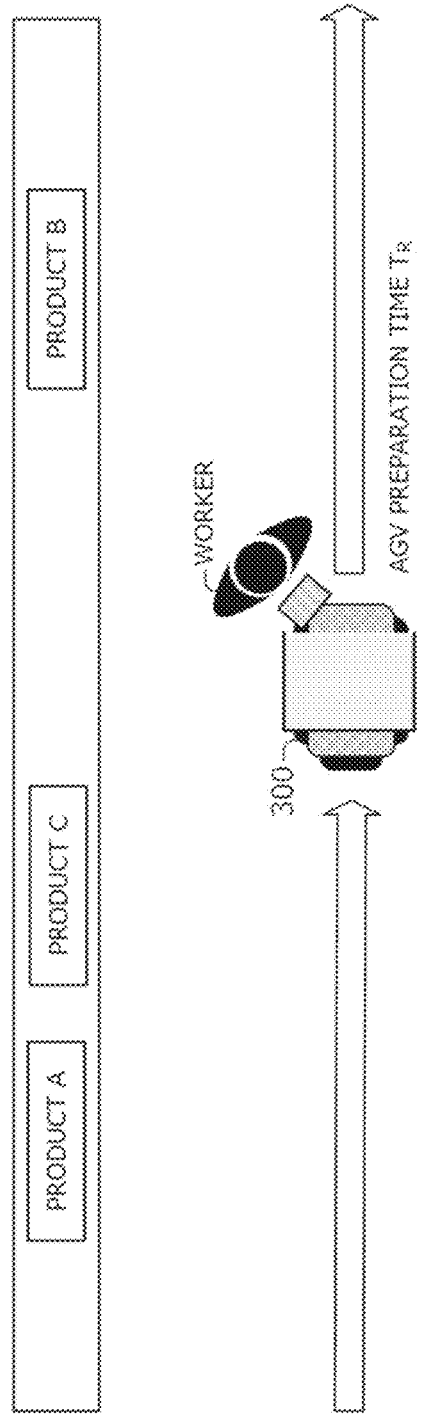

CONTROL METHOD, CONTROLLER, AND STORAGE MEDIUM

INCORPORATION OF BASIC APPLICATION

The present application claims the priority of Japanese Patent Application No. 2019-056081 filed on Mar. 25, 2019 in Japan, the contents of which are incorporated herein by reference in its entirety.

TECHNICAL FIELD

The present invention relates to a control method, controller, and storage medium.

BACKGROUND ART

Articles, such as products, stored in a warehouse or the like may be transported using a transporting vehicle that travels in an unattended manner.

Examples of a technology used when transporting articles using such an unattended transporting vehicle include PCT International Publication No. WO2015/097736. PCT International Publication No. WO2015/097736 discloses a picking system that includes a movable moving rack, an automated guided vehicle (AGV) that transports the moving rack, an AGV area in which the AGV transports the moving rack, a picking area that is adjacent to the AGV area and where the worker performs picking, and two or more picking locations in which the moving rack is temporarily placed. According to PCT International Publication No. WO2015/097736, the moving rack is placed in a picking location close to the worker on the basis of position information of the worker.

Patent Document 1: PCT International Publication No. WO2015/097736

SUMMARY OF INVENTION

An AGV and a worker may travel together to an article storage place, such as the inside of a warehouse, and the worker may load articles into a cage trolley placed on the AGV. In this case, the AGV often travels at a lower speed than the worker for safety and other reasons. Also, the AGV may be rotated or translated in a predetermined loading location for loading assistance and other purposes. However, such a preparation operation takes time. Accordingly, for example, if an AGV is always caused to travel near a worker as described in PCT International Publication No. WO2015/097736, it takes time for the preparation operation of the AGV, and there arises a problem that articles may not be loaded efficiently.

In view of the foregoing, an object of the present invention is to provide a control method, controller, and storage medium that solve the problem that when transporting articles using an AGV, the articles may not be loaded efficiently.

To accomplish the above object, a control method according to an aspect of the present invention is a control method performed by a controller. The control method includes: calculating times required for a worker to load, on an automated guided vehicle, a plurality of articles placed in a plurality of locations; and determining a stop position for the automated guided vehicle, based on the calculated times. The articles from the plurality of locations may be loaded by the worker in a plurality of different ways, and the time corresponding to the different ways are different.

A controller according to another aspect of the present invention includes determination means that calculates times required for the worker to load, on an automated guided vehicle, a plurality of articles placed in a plurality of locations regarding a plurality of cases among which a stop situation of the automated guided vehicle where the worker loads the articles varies and determines a position in which the automated guided vehicle is to be stopped, based on the calculated times.

A non-transitory computer-readable storage medium according to yet another aspect of the present invention is a non-transitory computer-readable storage medium storing a program including instructions for causing a controller to realize determination means that calculates times required for the worker to load, on an automated guided vehicle, a plurality of articles placed in a plurality of locations regarding a plurality of cases among which a stop situation of the automated guided vehicle varies and determines a position in which the automated guided vehicle is to be stopped, based on the calculated times.

According to the present invention thus configured, there can be provided a control method, controller, and storage medium that when transporting articles using an AGV, allow for loading the articles efficiently.

BRIEF DESCRIPTION OF THE DRAWINGS

FIG. 3A is a drawing showing an example of an operation that an AGV performs when making a stop;

FIG. 3B is a drawing showing an example of an operation that an AGV performs when making a stop;

FIG. 4 is a drawing showing an example of AGV operation information shown in FIG. 2;

FIG. 5 is a drawing showing an example of product information shown in FIG. 2;

FIG. 6 is a drawing showing an example of worker information shown in FIG. 2;

FIG. 7B is a drawing showing an AGV stop time calculation process;

FIG. 11 is a flowchart showing an example of an AGV stop position determination process;

FIG. 12A is a drawing showing other examples of the AGV stop time calculation process;

FIG. 12B is a drawing showing other examples of the AGV stop time calculation process.

DETAILED DESCRIPTION

First Example Embodiment

Figure 1:
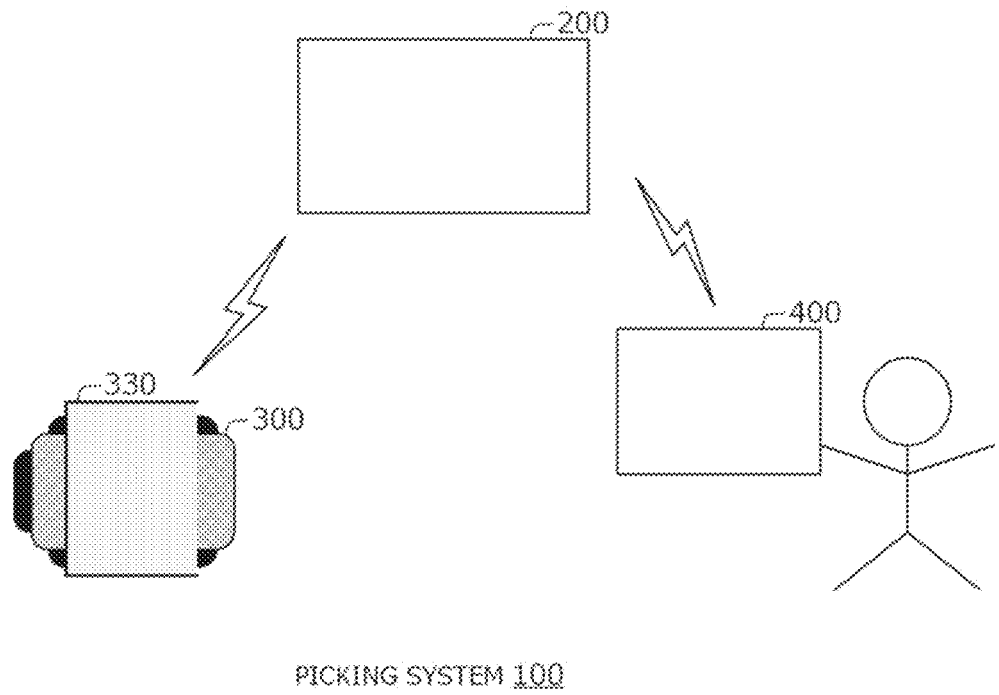
FIG. 1 is a drawing showing an example of the overall configuration of a picking system according to a first example embodiment of the present invention.
Figure 2:
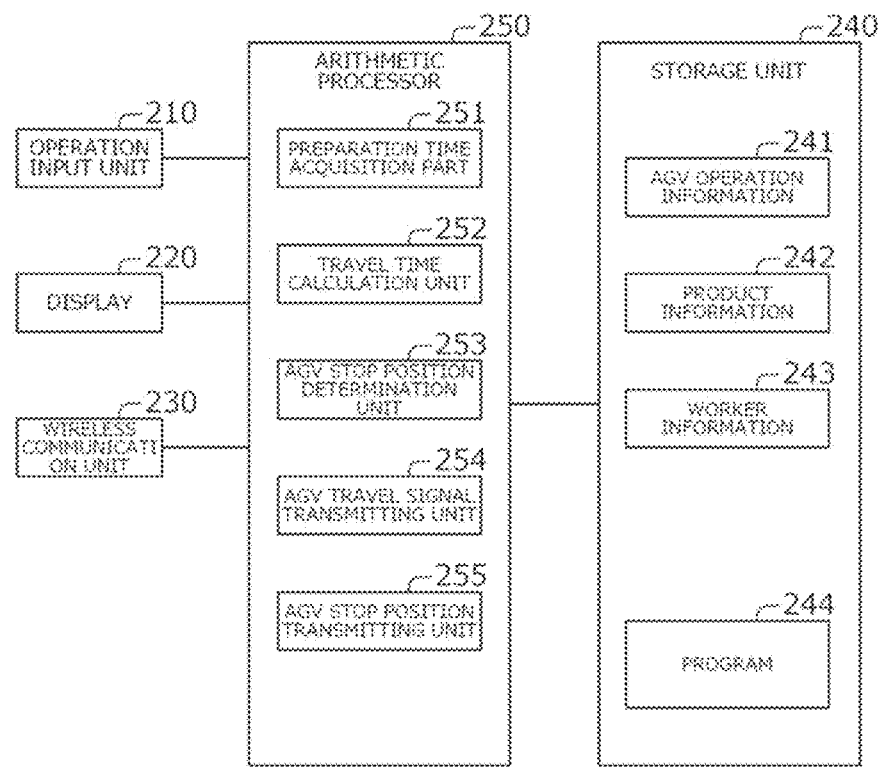
FIG. 2 is a block diagram showing an example of the configuration of an AGV controller shown in FIG. 1.
Figure 8:
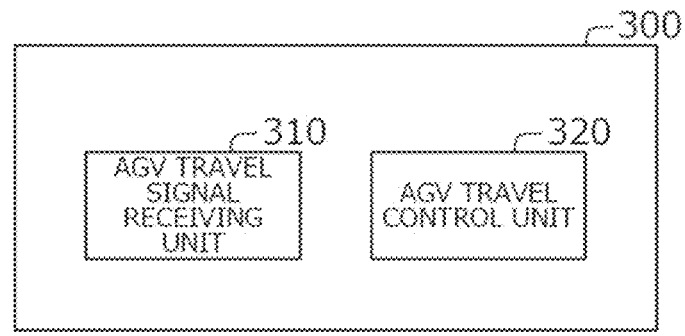
FIG. 8 is a block diagram showing an example of the configuration of the AGV shown in FIG. 1.
Figure 9:
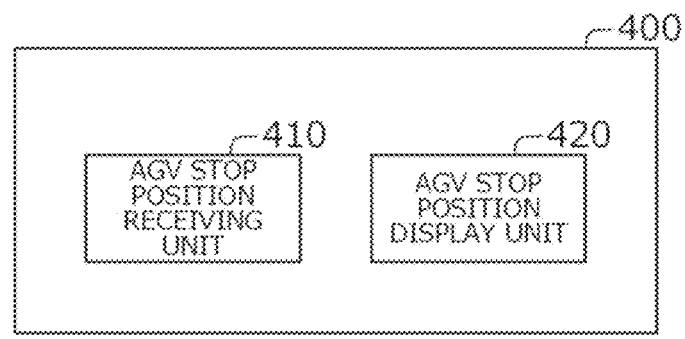
FIG. 9 is a block diagram showing an example of the configuration of a worker terminal shown in FIG. 1.
Figure 10:
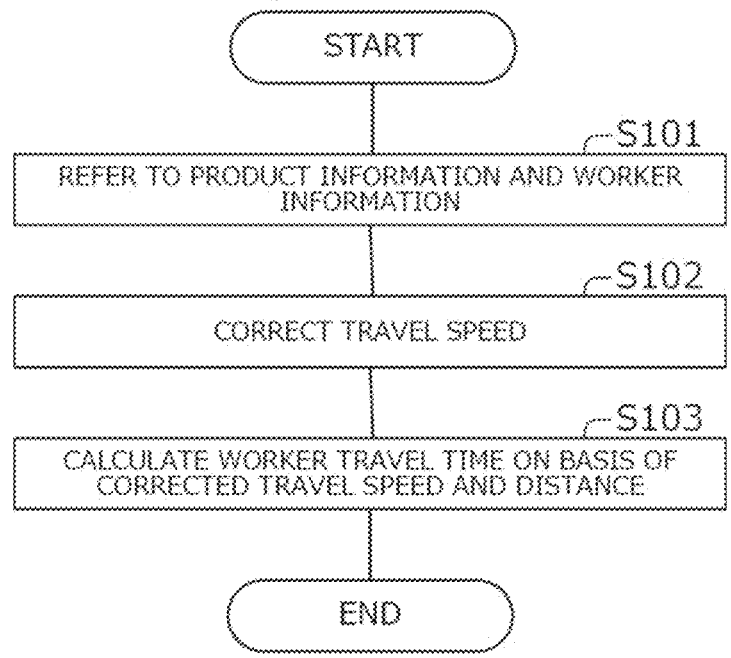
FIG. 10 is a flowchart showing an example of a worker travel time calculation process.

A first example embodiment of the present invention will be described with reference to FIGS. 1 to 12. FIG. 1 is a drawing showing an example of the overall configuration of a picking system 100. FIG. 2 is a block diagram showing an example of the configuration of an AGV controller 200. FIGS. 3A and 3B are drawings showing an example of an operation that an AGV performs when making a stop. FIG. 4 is a drawing showing an example of AGV operation information 241. FIG. 5 is a drawing showing an example of product information 242. FIG. 6 is a drawing showing an example of worker information 243. FIG. 7 is a drawing showing an AGV stop time calculation process. FIG. 8 is a block diagram showing an example of the configuration of an AGV 300. FIG. 9 is a block diagram showing an example of the configuration of a worker terminal 400. FIG. 10 is a flowchart showing an example of a worker travel time calculation process. FIG. 11 is a flowchart showing an example of an AGV stop position determination process. FIG. 12 is a flowchart showing another example of the AGV stop time calculation process.

In the first example embodiment of the present invention, the picking system 100 will be described in which the AGV (automated guided vehicle) 300 and a worker travel together to near racks on which products are stored, and the worker loads the products into a cage trolley 330 placed on the AGV 300. As will be described later, the AGV controller 200 according to this example embodiment calculates AGV stop times, which are the times required for the worker to load, on the AGV 300, multiple articles placed in multiple locations. According to an example embodiment, the multiple articles may be loaded using various methods, and as such, the stop situation of the AGV 300, such as the stop frequency or stop position, may vary accordingly. For example, the AGV controller 200 calculates AGV stop times, which are the times required to load two products on the AGV 200, with respect to two methods: a first method in which the worker loads two products in two different locations with the AGV 300, in which case, the AGV 300 is stopped in two separate positions corresponding to the two different locations of the two products and a second method in which the worker loads the two articles from the different locations with the AGV 300 stopped in a single position. The AGV controller 200 then determines a method having the shortest AGV stop time, as a method to be employed.

In this example embodiment, picking refers to work in which the worker loads products placed on racks into the cage trolley 330 placed on the AGV 300. For example, the cage trolley 330 placed on the AGV 300 is rectangular in plan view and has walls on side surfaces in three directions and an opening rather than a wall on a side surface in the travel direction of the AGV 300. This configuration allows the worker to easily load products into the cage trolley 330 from the opening side. In this example embodiment, the term "worker" refers to an entity which performs work of loading products placed on racks. The worker may be a person, or a machine such as a robot arm.

FIG. 1 shows an example of the overall configuration of the picking system 100. Referring to FIG. 1, the picking system 100 includes, for example, the AGV controller 200, the AGV 300, and the worker terminal 400. For example, the AGV 300 is located in a product storage rack placement area in a warehouse or the like, and the worker terminal 400 is held by the worker present in the area in which the AGV 300 is located.

As shown in FIG. 1, the AGV controller 200 and AGV 300 are wirelessly communicatively connected to each other. The AGV controller 200 and worker terminal 400 are also wirelessly communicatively connected to each other.

The configuration of the picking system 100 is not limited to that exemplified in FIG. 1. For example, the picking system 100 may include any numbers of AGV controllers 200, AGVs 300, and worker terminals 400. For example, the picking system 100 may include two or more multiple AGVs 300. The picking system 100 may also include two or more multiple worker terminals 400. The AGV 300 and worker terminal 400 may be wirelessly communicatively connected to each other. The worker terminal 400 may be mounted on the AGV 300.

The AGV controller 200 is a controller that controls the operation of the AGV 300. For example, the AGV controller 200 determines one of the multiple methods, as a method to be employed and transmits information indicating the determined stop position to the AGV 300 and worker terminal 400. According to an example embodiment, the multiple methods may have a different number of stops. In this example embodiment, the AGV controller 200 determines, as a method to be employed, one of the method in which the AGV 300 is stopped in front of respective products in two locations and the method in which the AGV 300 is stopped in front of one product in one location and the worker transports the other product. FIG. 2 shows an example of the configuration of the AGV controller 200. Referring to FIG. 2, the AGV controller 200 includes, as main components, for example, an operation input unit 210, a screen display unit 220, a wireless communication unit 230, a storage unit 240, and an arithmetic processor 250.

The operation input unit 210 includes operation input devices such as a keyboard and a mouse. The operation input unit 210 detects an operation of an operator who operates the AGV controller 200 and outputs the operation to the arithmetic processor 250. The operation input unit 210 can be used, for example, when inputting the AGV operation information 241, product information 242, worker information 243, or the like (to be described later).

The screen display unit 220 is formed by a liquid crystal display (LCD) or the like. The screen display unit 220 is able to display various types of information stored in the storage unit 240, information indicating the stop position of the AGV 300 determined by AGV stop position determination means 253 (to be described later), in accordance with an instruction from the arithmetic processor 250.

The wireless communication unit 230 includes an antenna and the like. The wireless communication unit 230 wirelessly transmits and receives information to and from the AGV 300 or worker terminal 400 through the antenna in accordance with an instruction from AGV travel signal transmitting means 254, AGV stop position transmitting means 255 (to be described later), or the like.

The storage unit 240 is a storage device such as a hard disk and memory. The storage unit 240 stores processing information or a program 244 required for the arithmetic processor 250 to perform any type of processing. When the program 244 is read and executed by the arithmetic processor 250, the above processing units are implemented. The program 244 is previously read from an external device or storage medium by the data input/output function of the AGV controller 200 and stored in the storage unit 240. Main information stored in the storage unit 240 includes the AGV operation information 241, product information 242, and worker information 243.

The AGV operation information 241 is information indicating the operation state of the AGV 300 in the warehouse. For example, the AGV operation information 241 includes information indicating an operation that the AGV 300 performs when making a stop.

Referring to FIGS. 3A and 3B, examples of a pre-stop operation, which is an operation that the AGV 300 can perform when making a stop, will be described. FIGS. 3A and 3B show examples of a pre-stop operation, which is an operation that the AGV 300 performs before making a stop. Specifically, FIG. 3A shows an example of a rotation operation that the AGV 300 performs when making a stop. FIG. 3B shows an example of a translation that the AGV 300 performs when making a stop.

The AGV 300 travels with the worker and stops in a position corresponding to a product to be picked or the like in accordance with a signal from the AGV controller 200. When making a stop, the AGV 300 is able not only to stop in front of the product or the like but also to perform a pre-stop operation, such as a rotation or translation. For example, as shown in FIG. 3A, when the AGV 300 arrives at a position specified by the AGV controller 200, it is rotated so that the opening of the cage trolley 330 placed on the AGV 300 is oriented toward the product. This allows the worker to easily load the product. Also, for example, as shown in FIG. 3B, when the AGV 300 arrives at a position specified by the AGV controller 200, it is translated toward the rack by a predetermined distance. This can prevent the stopped AGV 300 from obstructing the travel of other AGVs 300.

For example, in the AGV operation information 241, as shown in FIG. 4, information indicating pre-stop operations as exemplified above and AGV preparation times $T_R$, which are the times from when the AGV 300 arrives at specified positions until the pre-stop operations are complete, are associated with each other. For example, in the first row of FIG. 4, a pre-stop operation "XXXX" and an AGV preparation time $T_R$ "TT" are associated with each other. "XXXX" represents any pre-stop operation, such as a rotation or translation, as exemplified above. The AGV preparation time $T_R$ can also be said to be a preparation time from when the AGV 300 arrives at a specified position until it stops.

Note that examples of the pre-stop operation of the AGV 300 may include ones other than those exemplified above, such as an adjustment of the height of the cage trolley 330. Also, the pre-stop operation may be a combination of multiple operations, such as a combination of a rotation and a translation.

The AGV operation information 241 may be information in which condition information indicating conditions to be applied, pre-stop operations, and AGV preparation times $T_R$ are associated with each other. For example, condition information indicates the area including the location in which the AGV 300 is scheduled to stop, the time zone in which the AGV 300 stops, the operation situations of other AGVs 300 when the target AGV 300 stops, or the like. By including such condition information in the AGV operation information 241, it is possible to perform pre-stop operations corresponding to conditions, such as the area including the location in which the AGV 300 is scheduled to stop, the time zone in which the AGV 300 stops, and the operation situations of other AGVs 300.

The product information 242 is information indicating characteristics of products to be picked. FIG. 5 shows an example of the product information 242. Referring to FIG. 5, in the product information 242, for example, IDs, which are identification information of products, product names, which are the names of the products, sizes, which indicate the sizes of the products, and weights, which indicate the weights of the products, are associated with each other. For example, in the first row of FIG. 5, an ID "1," a product name "xxxxx," a size "yy," and a weight "zz" are associated with each other.

Note that the product information 242 may include information indicating characteristics of the products other than the information exemplified above. For example, the product information 242 may include information indicating handling difficulty, such as the shapes of the products or the presence or absence of a handle. The product information 242 may also include information indicating the locations in which the products are placed. The product information 242 may include part of the information indicating the characteristics of the products exemplified above.

The worker information 243 is information indicating characteristics of workers who perform picking, such as physical characteristics. FIG. 6 shows an example of the worker information 243. Referring to FIG. 6, in the worker information 243, for example, IDs, which are identification information of workers, the sex of the workers, the age of the workers, and transportable weights, which indicate weights transportable by the workers, are associated with each other. For example, in the first row of FIG. 6, an ID "1," sex "xx," age "aaa," and a transportable weight "aaa" are associated with each other. The transportable weights are predetermined values. The transportable weights may be weights previously calculated on the basis of the sex, age, or the like, or may be weights determined on the basis of the results of previously performed muscle force measurements or the like. In this example embodiment, the transportable weights may be determined using any method.

Note that the worker information 243 may include information indicating characteristics of the workers other than the information exemplified above. For example, the worker information 243 may include information indicating the height or the like in addition to the sex, age, or the like, as information indicating physical characteristics of the workers. The worker information 243 may also include information indicating actual load time values, which are the times required when the workers loaded products in the past, the averages of the actual load time values in a predetermined period, or the like. The worker information 243 may include part of the information indicating the characteristics of the workers exemplified above. If the worker is a machine, such as a robot arm, the worker information 243 may include information indicating the performance of the machine, or the like.

The arithmetic processor 250 includes a micro-processor, such as a micro-processing unit (MPU), and a peripheral circuit thereof. The arithmetic processor 250 has a function of implementing processing units with the above hardware and program 244 in collaboration with each other by reading the program 244 from the storage unit 240 and executing it. Examples of main processing units implemented by the arithmetic processor 250 include preparation time acquisition means 251, travel time calculation means 252, AGV stop position determination means 253, AGV travel signal transmitting means 254, and AGV stop position transmitting means 255.

The preparation time acquisition means 251 acquires the AGV preparation time $T_R$, which is the time from when the AGV 300 arrives at a specified position until a pre-stop operation, such as a rotation or translation, is complete. The AGV preparation time $T_R$ acquired by the preparation time acquisition means 251 is used when the AGV stop position determination means 253 (to be discussed later) calculates the AGV stop time.

For example, the preparation time acquisition means 251 refers to the AGV operation information 241. The preparation time acquisition means 251 then acquires the AGV preparation time $T_R$ included in the AGV operation information 241.

If condition information is included in the AGV operation information 241, the preparation time acquisition means 251 acquires information indicating the time indicated by a clock (not shown), the location where the AGV 300 is scheduled to stop. The preparation time acquisition means 251 then identifies a condition corresponding to the acquired information and acquires the AGV preparation time $T_R$ associated with the identified condition.

The travel time calculation means 252 calculates a worker travel time $T_M$, which represents the time required for a worker to bring back a product on a rack. The worker travel time calculated by the travel time calculation means 252 is used when the AGV stop position determination means 253 (to be discussed later) calculates the AGV stop time based on a method in which the worker loads two products with the AGV 300 stopped in one location.

For example, the travel time calculation means 252 refers to the product information 242 and worker information 243. The travel time calculation means 252 then calculates the worker travel time $T_M$ based on the referred information and the distance from the stop position of the AGV 300 to a product to be brought back.

For example, the travel time calculation means 252 calculates the distance between two products to be loaded. The distance between two products is calculated based on information indicating the placement locations of the products included in the product information 242. The travel time calculation means 252 then calculates the worker travel time $T_M$ based on a predetermined travel speed (e.g., the speed at which a common person walks, etc.) and the calculated distance (see FIG. 7B). For example, the travel time calculation means 252 calculates the worker travel time $T_M$ by dividing the round-trip distance from the stop position of the AGV 300 (e.g., a position corresponding to a product A in FIG. 7B) to the position of a product to be brought back (e.g., a position corresponding to a product B in FIG. 7B) by the travel speed.

In the above process, the travel time calculation means 252 corrects the travel speed based on the product information 242 and worker information 243. For example, as the product to be brought back has a larger size or larger weight, the product becomes more difficult to transport and the travel speed becomes slower. Also, if the worker is assumed to have higher transportation ability, for example, if the worker is male or younger or can transport a larger weight, the worker is less likely to be affected by the size or weight of the product. For this reason, the travel time calculation means 252 corrects the travel speed based on the size, weight, or the like of the product included in the product information 242 and the sex, age, transportable weight, or the like included in the worker information 243.

Specifically, the travel time calculation means 252 corrects the travel speed so that the travel speed becomes slower as the product to be loaded has a larger size. More specifically, the travel time calculation means 252 corrects the travel speed so that the travel speed becomes slower as the product to be loaded has a larger weight. The travel time calculation means 252 also increases the correction value so that the size or weight of the product has a larger influence when the worker is female compared to when the worker is male. The travel time calculation means 252 increases the correction value so that the size or weight of the product has a larger influence as the age of the worker is higher. Further, the travel time calculation means 252 corrects the correction value based on the transportable weight.

As seen above, the travel time calculation means 252 corrects the travel speed based on the product information 242 and worker information 243. The correction value corresponding to the size or weight of the product, or the sex, age, or transportable weight of the worker may be any predetermined value. For example, the travel time calculation means 252 may be configured to measure the travel speeds under respective conditions at an actual site and to calculate the correction value based on the basis of the measured travel speeds. The above correction values may be obtained using machine learning or the like. Also, the travel time calculation means 252 may be configured to identify the correction value corresponding to the size or weight of the product or the age, transportable weight, or the like of the worker by previously classifying the sizes of products, or the like into multiple groups using predetermined multiple steps of thresholds and identifying the group to which the size of the product, or the like belongs.

The travel time calculation means 252 may use a predetermined value (any value) as a value substantially indicating the distance between two products. In this case, the travel time calculation means 252 may be configured to previously calculate the worker travel time $T_M$ and store it in the storage unit 240. This configuration eliminates the need for the travel time calculation means 252 to always calculate the worker travel time $T_M$ before the worker loads two products into the cage trolley 330.

The travel time calculation means 252 may be configured to calculate the worker travel time $T_M$ considering the degree of fatigue of the worker, or the like. For example, the worker travel time $T_M$ may be longer as the AGV 300 stops at one location more frequently in a day.

Instead of correcting the travel speed, the travel time calculation means 252 may be configured to adjust the worker travel time $T_M$ by calculating the worker travel time $T_M$ on the basis of the travel speed and the distance and then adding or subtracting a value corresponding to information indicated by the product information 242 and worker information 243. According to this configuration, for example, a larger value is added as the product to be loaded has a larger size or a larger weight. The value to be added or subtracted may be a predetermined value or may be calculated on the basis of an actually measured value.

The AGV stop position determination means 253 calculates the AGV stop times, which are the time required for the worker to load multiple articles on the AGV 300, with respect to multiple methods among which the stop situation of the AGV 300. As such, the stop frequency or stop position may be different according to the multiple methods. In this example embodiment, the AGV stop position determination means 253 calculates the AGV stop times with respect to two methods: a first method in which the worker loads two products with the AGV 300 stopped in at two different positions corresponding to the two products and a second method in which the worker loads the two products with the AGV 300 stopped in a single position. The AGV stop position determination means 253 then determines a method having a shorter AGV stop time as a method to be employed. Thus, the AGV stop position determination means 253 determines the stop position or stop frequency of the AGV 300 such that the time required to load the products becomes shorter.

Figure 7A:
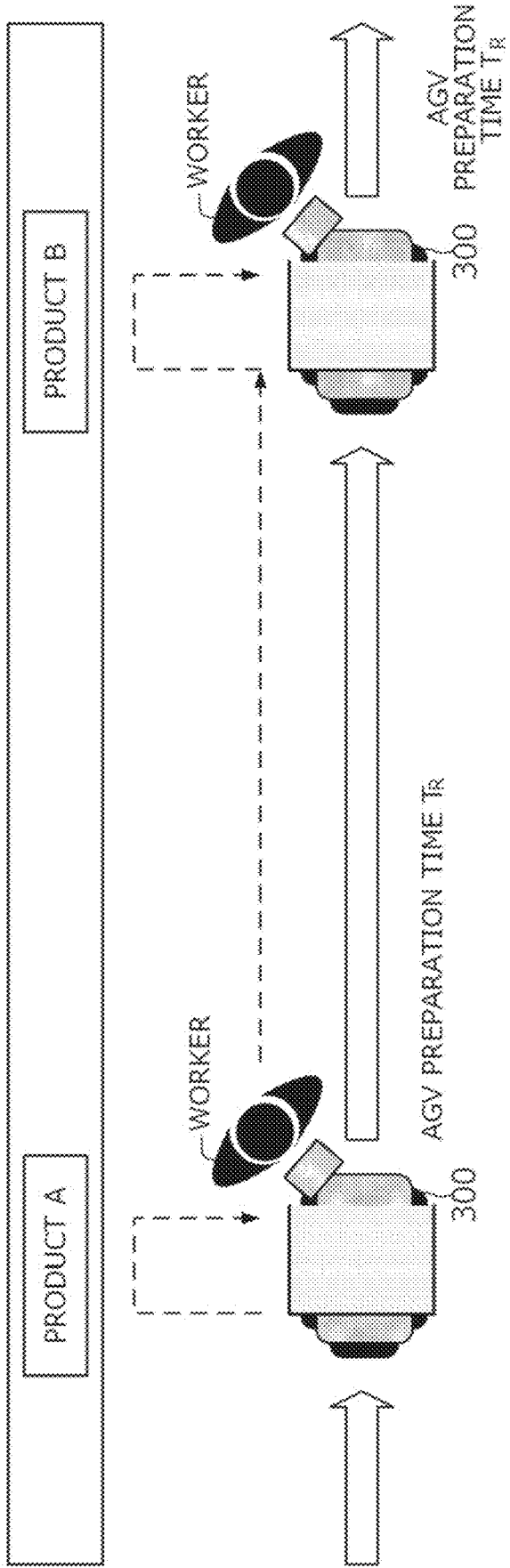
FIG. 7A is a drawing showing an AGV stop time calculation process.

FIGS. 7A and 7B are drawings showing an AGV stop time calculation process. Specifically, FIG. 7A is a drawing for describing an AGV stop time calculation process when the worker loads two products with the AGV 300 stopped in positions corresponding to the two products. FIG. 7B is a drawing for describing an AGV stop time calculation process when the worker loads the two products with the AGV 300 stopped in one of the positions.

For example, the AGV stop position determination means 253 acquires the AGV preparation time $T_R$ acquired by the preparation time acquisition means 251, as well as acquires the worker travel time $T_M$ calculated by the travel time calculation means 252. The AGV stop position determination means 253 then calculates the AGV stop time, which is the time during which the AGV is stopping while the worker loads two products on the AGV 300, based on the AGV preparation time and $T_R$ and worker travel time $T_M$.

For example, if the worker loads two products with the AGV 300 stopped in positions corresponding to the two products, as shown in FIG. 7A, the AGV preparation time $T_R$ is required twice, since the AGV 300 stops in the two positions. For this reason, under the first method, in which, the worker loads the two products with the AGV 300 stopped in the positions corresponding to the two products, the AGV stop position determination means 253 calculates the AGV stop time by doubling the AGV preparation time $T_R$. Also, as shown in FIG. 7B, if the worker loads the two products with the AGV 300 stopped in one of the positions, the AGV preparation time $T_R$ is required once and the worker travel time $T_M$ is required. For this reason, under the second method, in which, the worker loads the two products with the AGV 300 stopped in single position, the AGV stop position determination means 253 calculates the AGV stop time by adding the worker travel time $T_M$ to the AGV preparation time $T_R$.

For example, the AGV stop position determination means 253 acquires the AGV preparation time $T_R$ acquired by the preparation time acquisition means 251, as well as acquires the worker travel time $T_M$ calculated by the travel time calculation means 252. The AGV stop position determination means 253 then calculates the AGV stop time, which is the time during which the AGV is stopping while the worker loads two products on the AGV 300, on the basis of the AGV preparation time and $T_R$ and worker travel time $T_M$.

For example, after the AGV stop position determination means 253 calculates the AGV stop times in the two cases as described above, it makes a comparison between the calculated two AGV stop times. The AGV stop position determination means 253 then determines a method having a shorter AGV stop time as a method to be employed.

Note that the AGV stop position determination means 253 may be configured to, if the AGV stop times of the two methods are the same, determine one of the two-position stop method and the one-position stop method as a method to be employed. In this example embodiment, if the AGV stop times of the two methods are the same, the method to be employed may be determined in any manner.

The AGV stop position determination means 253 may be configured to calculate the distance over which the worker is able to transport a product, on the basis of the product information 242 or worker information 243. In this case, the AGV stop position determination means 253 may be configured to, if the one-way distance between two products exceeds the distance over which the worker is able to transport a product, determine the two-position stop method as a method to be employed, regardless of the AGV stop time. Note that the AGV stop position determination means 253 may calculate the transportable distance such that, for example, the transportable distance becomes shorter as the product has a larger size or larger weight. Also, as in the case in which the travel time calculation means 252 considers the worker information 243, the AGV stop position determination means 253 may correct the calculated distance on the basis of the worker information 243.

The AGV travel signal transmitting means 254 transmits the method determined by the AGV stop position determination means 253 to the AGV 300 as an AGV travel signal. The transmission of the AGV travel signal to the AGV 300 by the AGV travel signal transmitting means 254 is performed through the wireless communication unit 230. The AGV travel signal indicates the position in which the AGV 300 is to be stopped. For this reason, the AGV travel signal can also be said to be a signal that specifies the stop position of the AGV 300.

The AGV stop position transmitting means 255 transmits the method determined by the AGV stop position determination means 253 to the worker terminal 400 as information indicating the AGV stop position. The transmission of the information indicating the AGV stop position to the worker terminal 400 by the AGV stop position transmission means 255 is performed through the wireless communication unit 230.

What is described above is an example of the configuration of the AGV controller 200. The information indicating the AGV stop position determined by the AGV stop position determination means 253 may be displayed on the display 220 or the like.

The AGV 300 is an automated guided vehicle that travels with the worker. The AGV 300 stops in the position indicated by the AGV travel signal received from the AGV controller 2. As shown in FIG. 1, the cage trolley 330 is placed on the AGV 300. The worker loads products into the cage trolley 330.

FIG. 8 shows an example of the configuration of the AGV 300. Referring to FIG. 8, the AGV 300 includes, for example, AGV travel signal receiving means 310 and AGV travel control means 320. The above processing means are implemented in the AGV 300, for example, when an arithmetic device, such as a central processing unit (CPU), executes a program stored in a storage device.

The AGV travel signal receiving means 310 includes an antenna. The AGV travel signal receiving means 310 receives the AGV travel signal wirelessly transmitted by the AGV travel signal transmitting means 254.

The AGV travel control means 320 controls the travel of the AGV 300, as well as stops the AGV 300 in the stop position indicated by the AGV travel signal received by the AGV travel signal receiving means 310.

The AGV travel control means 320 may use any method to control the travel of the AGV as long as it is able to stop the AGV 300 in the stop position indicated by the AGV travel signal received by the AGV travel signal receiving means 310. For example, the AGV travel control means 320 may be configured to control the travel of the AGV 300 on the basis of information acquired by sensors, such as a gyro-sensor and an acceleration sensor, provided on the AGV 300 and a map stored in the storage unit 240. The AGV travel control means 320 may be configured to control the travel of the AGV 300 using a known method other than that exemplified above, such as image recognition, optical method, or electromagnetic induction.

The worker terminal 400 is a mobile terminal held by the worker. The worker terminal 400 is, for example, an information processing terminal including a screen display unit, such as a tablet.

FIG. 9 shows an example of the configuration of the worker terminal 400. Referring to FIG. 9, the worker terminal 400 includes, for example, AGV stop position receiving means 410 and AGV stop position display means 420. The above processing means are implemented in the worker terminal 400, for example, when an arithmetic device, such as a CPU, executes a program stored in a storage device.

The AGV stop position receiving means 410 includes an antenna and the like. The AGV stop position receiving means 410 receives information indicating the AGV stop position wirelessly transmitted by the AGV stop position transmitting means 255.

The AGV stop position display means 420 displays the stop position of the AGV 300 indicated by the information received by the AGV stop position receiving means 410 on the screen display unit of the worker terminal 400. For example, the AGV stop position display means 420 displays the stop position of the AGV 300 on the screen display unit by displaying a predetermined sign, such as a mark, in a position corresponding to the stop position on a map of a warehouse in which the AGV 300 and worker are present.

What is described above is an example of the configuration of the picking system 100. Next, referring to FIGS. 10 and 11, an example of the operation of the AGV controller 200 will be described.

First, referring to FIG. 10, an example of a worker travel time $T_M$ calculation process will be described. FIG. 10 is a flowchart showing an example of a worker travel time $T_M$ calculation process. Referring to FIG. 10, the travel time calculation means 252 refers to the product information 242 and worker information 243 (step S101).

The travel time calculation means 252 corrects the travel speed on the basis of the product information 242 and worker information 243 (step S102). The correction value corresponding to the size or weight of the product or the sex, age, or transportable weight of the worker may be predetermined. For example, the travel time calculation means 252 may be configured to measure the travel speeds under respective conditions at an actual site and to calculate the correction value on the basis of the measured travel speeds.

The travel time calculation means 252 calculates the worker travel time $T_M$ on the basis of the corrected travel speed and the distance between two products (step S103). For example, the travel time calculation means 252 calculates the worker travel time $T_M$ by dividing the round-trip distance between the two products by the corrected travel speed.

What is described above is an example of the worker travel time $T_M$ calculation process. Next, referring to FIG. 11, an example of an AGV stop position determination process will be described.

FIG. 11 is a flowchart showing an example of an AGV stop position determination process. Referring to FIG. 11, the AGV stop position determination means 253 acquires the AGV preparation time $T_R$ and worker travel time $T_M$ (step S201). The AGV preparation time $T_R$ is acquired by the preparation time acquisition means 251. The worker travel time $T_M$ is calculated by the process described with reference to FIG. 10.

The AGV stop position determination means 253 calculates the AGV stop times with respect to a method in which the worker loads two products with the AGV 300 stopped in positions corresponding to the two products and a method in which the worker loads the two products with the AGV 300 stopped in one of the positions (step S202). For example, the AGV stop position determination means 253 calculates the AGV stop time, which is the time during which the AGV is stopping while the worker loads two products on the AGV 300, on the basis of the AGV preparation time and $T_R$ and worker travel time $T_M$. Specifically, for example, the AGV stop position determination means 253 calculates the AGV stop time of the two-position stop method by doubling the AGV preparation time $T_R$. The AGV stop position determination means 253 also calculates the AGV stop time of the one-position stop method by adding the worker travel time $T_M$ to the AGV preparation time $T_R$.

The AGV stop position determination means 253 makes a comparison between the calculated two AGV stop times (step S203). If the AGV stop time of the two-position stop method is shorter ("stop in two positions" in step S203), the AGV stop position determination means 253 determines stops of the AGV 300 in front of the two products (step S204). On the other hand, if the AGV stop time of the one-position stop method is shorter ("stop in one position" in step S203), the AGV stop position determination means 253 determines a stop of the AGV 300 in front of one of the two products (step S205).

After the determination by the AGV stop position determination means 253, the AGV travel signal transmitting means 254 transmits the method determined by the AGV stop position determination means 253 to the AGV 300 as an AGV travel signal. The AGV stop position transmitting means 255 transmits the method determined by the AGV stop position determination means 253 to the worker terminal 400 as information indicating the AGV stop position. As seen above, the AGV travel signal transmitting means 254 and AGV stop position transmitting means 255 transmit the information indicating the stop position (step S206).

As described above, the AGV controller 200 includes the preparation time acquisition means 251, travel time calculation means 252, and AGV stop position determination means 253. According to this configuration, the AGV stop position determination means 253 is able to calculate the AGV stop times of the two-position stop method and one-position stop method based on the AGV preparation time $T_R$ acquired by the preparation time acquisition means 251 and the worker travel time $T_M$ calculated by the travel time calculation means 252 and to determine a method having a shorter AGV stop time as a method to be employed based on the calculated AGV stop times. This allows the AGV 300 to be stopped more efficiently. Thus, when transporting products, which are articles, using an automated guided vehicle, the products can be loaded efficiently.

AGV stop times. This allows the AGV 300 to be stopped more efficiently. Thus, when transporting products, which are articles, using an automated guided vehicle, the products can be loaded efficiently.

In this example embodiment, the AGV controller 200 determines, as a method to be employed, one of the method in which the AGV 300 is stopped in front of respective products in two locations and the method in which the worker transports one product in one of the locations with the AGV 300 stopped in front of the other product in the other location. However, the AGV controller 200 may be configured to consider a method other than the two methods exemplified above.

FIGS. 12A and 12B show examples of methods other than the two methods. For example, FIG. 12A shows a case in which the AGV 300 is stopped between two products: a product A and a product B. As shown in FIG. 12A, the AGV controller 200 may be configured to calculate the AGV stop time in the case in which the AGV 300 is stopped between the two products (e.g., at the midpoint therebetween or in a predetermined position closer to the heavier of the two products) and to determine a method to be employed on the basis of the calculated AGV stop time. In cases as shown in FIG. 12A, the travel time calculation means 252 calculates two worker travel times $T_M$: a first worker travel time $T_M$, which represents the time required for the worker to leave the stop position of the AGV 300 and bring back the product A, and a second worker travel time $T_M$, which represents the time required for the worker to leave the stop position of the AGV 300 and bring back the product B. The AGV stop position determination means 253 then calculates the AGV stop time by adding up the AGV preparation time $T_R$, first worker travel time $T_M$, and second worker travel time $T_M$.

FIG. 12B shows a case in which the worker brings back three products with the AGV 300 stopped in one location. As shown in FIG. 12B, the AGV controller 200 may be configured to calculate the AGV stop time in the case in which the AGV 300 is stopped among the three products (or in front of one of the three products) and to determine a method to be employed based on the calculated AGV stop time. In cases as shown in FIG. 12B, the travel time calculation means 252 calculates the worker first travel time $T_M$, which represents the time required for the worker to leave the stop position of the AGV 300 and bring back a product A, the worker second travel time $T_M$, which represents the time required for the worker to leave the stop position of the AGV 300 and bring back a product B, and a worker third travel time $T_M$, which represents the time required for the worker to leave the stop position of the AGV 300 and bring back a product C. The AGV stop position determination means 253 then calculates the AGV stop time by adding up the AGV preparation time $T_R$, worker first travel time $T_M$, worker second travel time $T_M$, and worker third travel time $T_M$. As seen above, the AGV controller 200 may be configured to consider a case in which the worker brings back three or more products with the AGV 300 stopped in one location.

As described above, the AGV controller 200 may be configured to consider a method other than the two methods exemplified above. In this case, the AGV controller 200 may be configured to consider three or more methods, for example, may determine a method to be employed from predetermined three methods.

In this example embodiment, the picking system 100 uses the AGV 300, which is an automated guided vehicle. However, the picking system 100 may include a vehicle driven by a human in place of the AGV 300. If the picking system 100 includes a vehicle driven by a human, a controller corresponding to the AGV controller 200 gives an instruction about the stop position to this vehicle. In such a configuration, a human who drives the vehicle and a worker who loads products may be the same person or may be different persons. If a machine, such as a robot arm, is employed as a worker, the machine, such as a robot arm, may travel with the AGV 300, or may be disposed on a rack on which a product is placed or near the rack.

Second Example Embodiment

Next, referring to FIG. 13, a second example embodiment of the present invention will be described. In the second example embodiment, the configuration of a controller 50 will be outlined.

Figure 13:
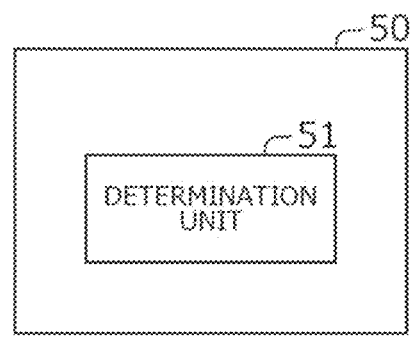
FIG. 13 is a drawing showing an example of the configuration of a controller according to a second example embodiment of the present invention.

FIG. 13 shows an example of the configuration of the controller 50. Referring to FIG. 13, the controller 50 includes determination means 51. For example, the controller 50 includes an arithmetic device, such as a CPU, and a storage device. The above processing means is implemented in the controller 50 when the arithmetic device executes a program stored in the storage device.

The determination means 51 calculates the times required for a worker to load, on an automated guided vehicle, multiple articles placed in multiple locations. As discussed above, multiple methods may be employed to load the multiple articles, and as such, the stop situation of the automated guided vehicle where the worker loads the articles may vary. The determination means 51 then determines the position in which the automated guided vehicle is to be stopped, based on the calculated times.

As described above, the controller 50 includes the determination means 51. According to this configuration, the determination means 51 is able to calculate the times required for the worker to load multiple articles on the automated guided vehicle with respect to multiple methods among which the stop situation of the automated guided vehicle where the articles are loaded varies and to determine the position in which the automated guided vehicle is to be stopped, on the basis of the calculated times. For example, the determination means 51 is able to determine a method having a shorter calculated time as a method to be employed, on the basis of the calculated times. This allows the automated guided vehicle to be stopped more efficiently. Thus, when transporting articles using the automated guided vehicle, the articles can be loaded efficiently.

The determination means 51 can be implemented by incorporating a predetermined program into the controller 50. Specifically, a program according to another example embodiment of the present invention is a program for implementing, in the controller 50, the determination means 51 that calculates the times required for the worker to load, on the automated guided vehicle, multiple articles placed in multiple locations with respect to multiple methods among which the stop situation of the automated guided vehicle varies and determines the position in which the automated guided vehicle is to be stopped, on the basis of the calculated times.

Also, a control method performed by the controller 50 is a method including calculating the times required for the worker to load, on the automated guided vehicle, multiple articles placed in multiple locations with respect to multiple methods among which the stop situation of the automated guided vehicle varies and determining the position in which the automated guided vehicle is to be stopped, on the basis of the calculated times.

The program and control method having the above configurations also have advantageous effects similar to those of the controller 50 and therefore are able to accomplish the object of the present invention. A storage medium storing the program also has similar advantageous effects and therefore is able to accomplish the object of the present invention.

Supplementary Notes

A part or all of the example embodiments can be described as in Supplementary Notes below. A controller and the like of the present invention will be outlined below. However, the present invention is not limited to the following configurations.

Supplementary Note 1

A control method performed by a controller, including:

calculating times required for a worker to load, on an automated guided vehicle, a plurality of articles placed in a plurality of locations regarding a plurality of cases among which a stop situation of the automated guided vehicle where the worker loads the articles varies; and determining a position in which the automated guided vehicle is to be stopped, based on the calculated times.

Supplementary Note 2

The control method of Supplementary Note 1, wherein calculating times required for the worker to load, on an automated guided vehicle, a plurality of articles placed in a plurality of locations regarding a plurality of cases among which a stop situation of the automated guided vehicle where the worker loads the articles varies is performed based on a preparation time which is a time from when the automated guided vehicle arrives at a specified position until the automated guided vehicle stops and a worker travel time which is a time required for the worker to bring back an article.

Supplementary Note 3

The control method of Supplementary Note 2, wherein the worker travel time is calculated based on article information indicating characteristics of the articles and worker information indicating characteristics of the worker.

Supplementary Note 4

The control method of Supplementary Note 3, wherein the article information includes at least one of information indicating sizes of the articles and information indicating weights of the articles.

Supplementary Note 5

The control method of Supplementary Note 3 or 4, wherein the worker information includes information indicating physical characteristics of the workers.

Supplementary Note 6

The control method of any one of Supplementary Notes 2 to 5, wherein the preparation time represents a time from when the automated guided vehicle arrives at a specified position until a pre-stop operation is complete, the pre-stop operation being is an operation that the automated guided vehicle performs before making a stop.

Supplementary Note 7

The control method of any one of Supplementary Notes 1 to 6, wherein times required for the worker to load, on an automated guided vehicle, a plurality of articles placed in a plurality of locations regarding a plurality of cases among which a stop frequency or stop position of the automated guided vehicle where the worker loads the articles varies are calculated.

Supplementary Note 8

The control method of Supplementary Note 7, wherein a time required to load two articles placed in two locations in a case in which the automated guided vehicle is stopped in front of the two articles is calculated, and a time required to load the two articles in a case in which the automated guided vehicle is stopped in front of one of the two articles placed in one of the two locations is also calculated.

Supplementary Note 9

The control method of any one of Supplementary Notes 1 to 8, wherein the position in which the automated guided vehicle is to be stopped is determined such that a time required to load articles becomes shorter.

Supplementary Note 10

The control method of Supplementary Note 9, wherein a time required to load two articles placed in two locations in a case in which the automated guided vehicle is stopped in front of the respective articles is calculated, and a time required to load the two articles in a case in which the automated guided vehicle is stopped in front of one of the two articles placed in one of the two locations is also calculated, and it is determined whether the automated guided vehicle is to be stopped in front of the respective articles placed in the two locations or in front of the one article placed in the one location, based on the calculated times.

Supplementary Note 11

A controller comprising determination means that calculates times required for a worker to load, on an automated guided vehicle, multiple articles placed in multiple locations in multiple cases among which a stop situation of the automated guided vehicle where the worker loads the articles varies and determines a position in which the automated guided vehicle is to be stopped, based on the calculated times.

Supplementary Note 12

A non-transitory computer-readable storage medium storing a program comprising instructions for causing a controller to realize determination means that calculates times required for a worker to load, on an automated guided vehicle, multiple articles placed in multiple locations regarding multiple cases among which a stop situation of the automated guided vehicle varies and determines a position in which the automated guided vehicle is to be stopped, based on the calculated times.

The programs described in the example embodiments and Supplementary Notes are stored in a storage device or a computer-readable storage medium. For example, the storage medium is a transportable medium, such as a flexible disk, optical disk, magneto-optical disk, or semiconductor memory.

While the present invention has been described with reference to the example embodiments, the present invention is not limited thereto. Various changes appreciable by those skilled in the art can be made to the configuration or details of the present invention within the scope of the present invention.

DESCRIPTION OF REFERENCE NUMERALS 100 picking system
200 AGV controller
210 operation input unit
220 screen display unit
230 wireless communication unit
240 storage unit
241 AGV operation information
242 product information
243 worker information
244 program
250 arithmetic processor
251 preparation time acquisition means
252 travel time calculation means
253 AGV stop position determination means
254 AGV travel signal transmitting means
255 AGV stop position transmitting means
300 AGV
310 AGV travel signal receiving means
320 AGV travel control means
330 cage trolley
400 worker terminal
410 AGV stop position receiving means
420 AGV stop position display means
50 controller
51 determination means

What is claimed is:

1. A control method performed by a controller, comprising:

calculating times required for a worker to load, on an automated guided vehicle, a plurality of articles placed in a plurality of locations, wherein the times are calculated based on a plurality of different stop situations, each of the stop situations being defined by a location where the automated guided vehicle stops to receive articles to be loaded from the worker into the automated guided vehicle; and determining a stop position for the automated guided vehicle based on the calculated times.

2. The control method of claim 1, wherein calculating the times is performed based on a preparation time which is a time from when the automated guided vehicle arrives at a specified position until the automated guided vehicle stops and a worker travel time which is a time required for the worker to bring back an article.

3. The control method of claim 2, wherein the worker travel time is calculated based on article information indicating characteristics of the articles and worker information indicating characteristics of the worker.

4. The control method of claim 3, wherein the article information includes at least one of information indicating sizes of the articles and information indicating weights of the articles.

5. The control method of claim 3, wherein the worker information includes information indicating physical characteristics of the workers.

6. The control method of claim 2, wherein the preparation time represents a time from when the automated guided vehicle arrives at a specified position until a pre-stop operation is complete, the pre-stop operation being is an operation that the automated guided vehicle performs before making a stop.

7. The control method of claim 1, wherein times required for the worker to load, on the automated guided vehicle, varies based on the plurality of different stopping situations.

8. The control method of claim 7, wherein the calculated times are based on:
a first time required to load two articles placed in two locations when the automated guided vehicle is stopped in front of the respective articles is calculated, and
a second time required to load the two articles when the automated guided vehicle is stopped in front of one of the two articles placed in one of the two locations is also calculated.

9. The control method of claim 1, wherein the position in which the automated guided vehicle is to be stopped is determined such that a time required to load articles becomes shorter.

10. The control method of claim 9, wherein
a time required to load two articles placed in two locations in a case in which the automated guided vehicle is stopped in front of the respective articles is calculated, and a time required to load the two articles in a case in which the automated guided vehicle is stopped in front of one of the two articles placed in one of the two locations is also calculated, and it is determined whether the automated guided vehicle is to be stopped in front of the respective articles placed in the two locations or in front of the one article placed in the one location, based on the calculated times.

11. An apparatus comprising:
a memory storing one or more instructions; and
at least one processor configured to execute the one or more instructions to:
calculate times required for a worker to load, on an automated guided vehicle, a plurality of articles placed in a plurality of locations, wherein the times are calculated based on a plurality of different stop situations, each of the stop situations being defined by a location where the automated guided vehicle stops to receive articles to be loaded from the worker into the automated guided vehicle; and
determine a stop position for the automated guided vehicle based on the calculated times.

12. A non-transitory computer-readable storage medium storing a program comprising instructions for causing a processor to perform a method comprising:
calculating times required for a worker to load, on an automated guided vehicle, a plurality of articles placed in a plurality of locations, wherein the times are calculated based on a plurality of different stop situations, each of the stop situations being defined by a location where the automated guided vehicle stops to receive articles to be loaded from the worker into the automated guided vehicle; and
determining a stop position for the automated guided vehicle based on the calculated times.

* * * * *